US006951167B2

(12) United States Patent
Sung et al.

(10) Patent No.: US 6,951,167 B2
(45) Date of Patent: Oct. 4, 2005

(54) BREAD MAKER

(75) Inventors: Han-jun Sung, Suwon (KR); Jae-ryong Park, Suwon (KR)

(73) Assignee: Samsung Electronic Co., Ltd., Suwon-si (KR)

( * ) Notice: Subject to any disclaimer, the term of this patent is extended or adjusted under 35 U.S.C. 154(b) by 97 days.

(21) Appl. No.: 10/308,005

(22) Filed: Dec. 3, 2002

(65) Prior Publication Data

US 2004/0011208 A1 Jan. 22, 2004

(30) Foreign Application Priority Data

Jul. 19, 2002 (KR) ........................................ 2002-42585

(51) Int. Cl.[7] ................................................ A21B 1/00
(52) U.S. Cl. ........................................... 99/348; 99/473
(58) Field of Search .......................... 99/348, 473, 467; 126/369, 20

(56) References Cited

U.S. PATENT DOCUMENTS 4,803,086 A 2/1989 Hedenberg
5,735,190 A * 4/1998 Sham .......................... 99/327
5,947,009 A * 9/1999 Hedenberg ................... 99/348
5,967,020 A * 10/1999 Soyama et al. ............... 99/327
6,029,563 A * 2/2000 Nakagawa et al. ........... 99/327

FOREIGN PATENT DOCUMENTS

KR 2002-60015 7/2002

* cited by examiner

*Primary Examiner*—Reginald L. Alexander
(74) *Attorney, Agent, or Firm*—Staas & Halsey LLP

(57) ABSTRACT

A bread maker including a casing forming an outer enclosure and a baking tray inside the casing to contain bread dough. An upper heater inside the casing faces an opening in the top of the baking tray to heat the baking tray. A lower heater inside the casing faces a lateral part of the baking tray to heat the baking tray. A water reservoir filled with water inside the casing adjacent to the lower heater generates steam while being heated by the lower heater.

27 Claims, 6 Drawing Sheets

BREAD MAKER

CROSS-REFERENCE TO RELATED APPLICATIONS

This application claims the benefit of Korean Application No. 2002-42585, filed Jul. 19, 2002, in the Korean Intellectual Property Office, the disclosure of which is incorporated herein by reference.

BACKGROUND OF THE INVENTION

1. Field of the Invention

The present invention relates to a bread maker, and more particularly, to a bread maker with a steam generating structure to provide a moisture environment inside the bread maker.

2. Description of the Related Art

FIG. 1 is a side sectional view partially illustrating a conventional bread maker. As shown therein, a bread maker generally comprises a casing 11 forming an outer enclosure, a door 13 rotatably connected to the casing 11 to open and close an entrance in the casing 11, and a baking tray 15 inside the casing 11 in which dough 14 for bread is contained.

On the lower inside walls of the casing 11 facing opposite walls of the baking tray 15 are lower brackets 17*a*. Lower heaters 17 are connected to the lower brackets 17*a* to bake a lateral part of the dough 14 contained in the baking tray 15. On the upper inside walls of the casing 11 facing an opening 15*a* of the baking tray 15 are upper brackets 16*a*. Upper heaters 16 are connected to the upper brackets 16*a* to bake an upper part of the dough 14 contained in the baking tray 15.

However, in the conventional bread maker, a problem occurs in that moisture inside the dough 14 is excessively vaporized through the surface thereof while the dough 14 is baking, so that the bread is likely to have a hard or cracked crust. Hence, the crust of the bread is not satisfactorily baked because the surface of the dough 14 has low moisture while being baked, and it is difficult to keep the moisture in the bread.

To solve the above problem, there has been proposed a bread maker with a steam generator in a casing in U.S. Pat. No. 4,803,086. However, in this bread maker, there are additionally needed a heater for generating steam, a pipe, a valve, and a water reservoir for dispensing water to the steam generator, resulting in the structure of the bread maker being complicated.

SUMMARY OF THE INVENTION

It is an object of the present invention to provide a bread maker which has a simple steam generating structure, and is capable of tastily baking bread by controlling moisture environment thereinside.

Additional objects and advantages of the invention will be set forth in part in the description that follows, and, in part, will be obvious from the description, or may be learned by practice of the invention.

To achieve the above and other objects according to an embodiment of the present invention, there is provided a bread maker having a casing forming an outer enclosure, and a baking tray inside the casing to contain bread dough, including an upper heater inside the casing and facing an opening in the top of the baking tray to heat the baking tray;

a lower heater inside the casing and facing a lateral part of the baking tray to heat the baking tray; and a water reservoir filled with water inside the casing adjacent to the lower heater, and generating steam while being heated by the lower heater.

A distance from a bottom of the bread maker to a top of the water reservoir is substantially equal to or higher than a distance from the bottom of the bread maker to the top of the baking tray to readily supply steam to the bread dough.

The water reservoir is detachably installed to the inside of the casing.

The water reservoir has at least one hooking flange at a side thereof, and the casing has at least one hooking flange holder to which the hooking flange of the water reservoir is attached.

The water reservoir has a plurality of projections under the hooking flanges, which protrude from the side of the water reservoir substantially the same distance as the hooking flanges, to prevent the water reservoir from tipping when the hooking flanges are hooked onto the hooking flange holder.

The casing has a projection under the hooking flange holder, which protrudes from the side of the water reservoir substantially the same distance as the hooking flange.

The bread maker further includes an auxiliary heater inside the casing to heat a lateral part of the water reservoir and adjust an amount of the steam generated from the water reservoir.

The bread maker further includes a heat-insulated bracket connected to an outside wall of the casing adjacent to the auxiliary heater, and used for heat insulation.

To achieve the above and other objects according to another aspect of the present invention, there is provided a water reservoir for a bread maker having a casing, and a baking tray and a heater inside the casing, including a container holding water inside the casing adjacent to the heater, the container being heated by the heater to produce steam; a plurality of hooking flanges on a back side of the container and a plurality of hooking flange holders attached to the inside of the casing to receive the hooking flanges and support the container; and a plurality of projections on the back side of the container, extending substantially the same distance as the hooking flanges, to prevent the container from tipping as the hooking flanges are attached to the hooking flange holders.

To achieve the above and other objects according to another aspect of the present invention, there is provided a steam generation assembly for a bread maker having a casing, and a baking tray and a heater inside the casing, including a water reservoir holding water inside the casing adjacent to the heater, the water reservoir being heated by the heater to produce steam; a plurality of hooking flanges on a back side of the water reservoir and a plurality of hooking flange holders attached to the inside of the casing to receive the hooking flanges and support the water reservoir; a plurality of projections on the back side of the water reservoir, extending substantially the same distance as the hooking flanges, to prevent the water reservoir from tipping as the hooking flanges are attached to the hooking flange holders; and an auxiliary heater inside the casing and adjacent to the water reservoir, the auxiliary heater heating the water reservoir to generate additional steam.

To achieve the above and other objects according to another aspect of the present invention, there is provided a steam generation apparatus for a bread maker having a casing, a baking tray inside the casing, and a heater inside the casing to heat the baking tray, including a water reservoir holding water inside the casing adjacent to the heater, the water reservoir being heated by the heater to produce steam; an auxiliary heater projecting through the casing into an interior of the casing adjacent to the water reservoir, the auxiliary heater heating the water reservoir to generate additional steam; and a heat-insulated bracket attached to an outside wall of the casing adjacent to and surrounding the auxiliary heater to provide heat insulation.

These together with other aspects and advantages which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

These and other objects and advantages of the present invention will become apparent and more readily appreciated from the following description of the embodiments, taken in conjunction with the accompany drawings, of which.

DETAILED DESCRIPTION OF THE PREFERRED EMBODIMENT

Figure 1:
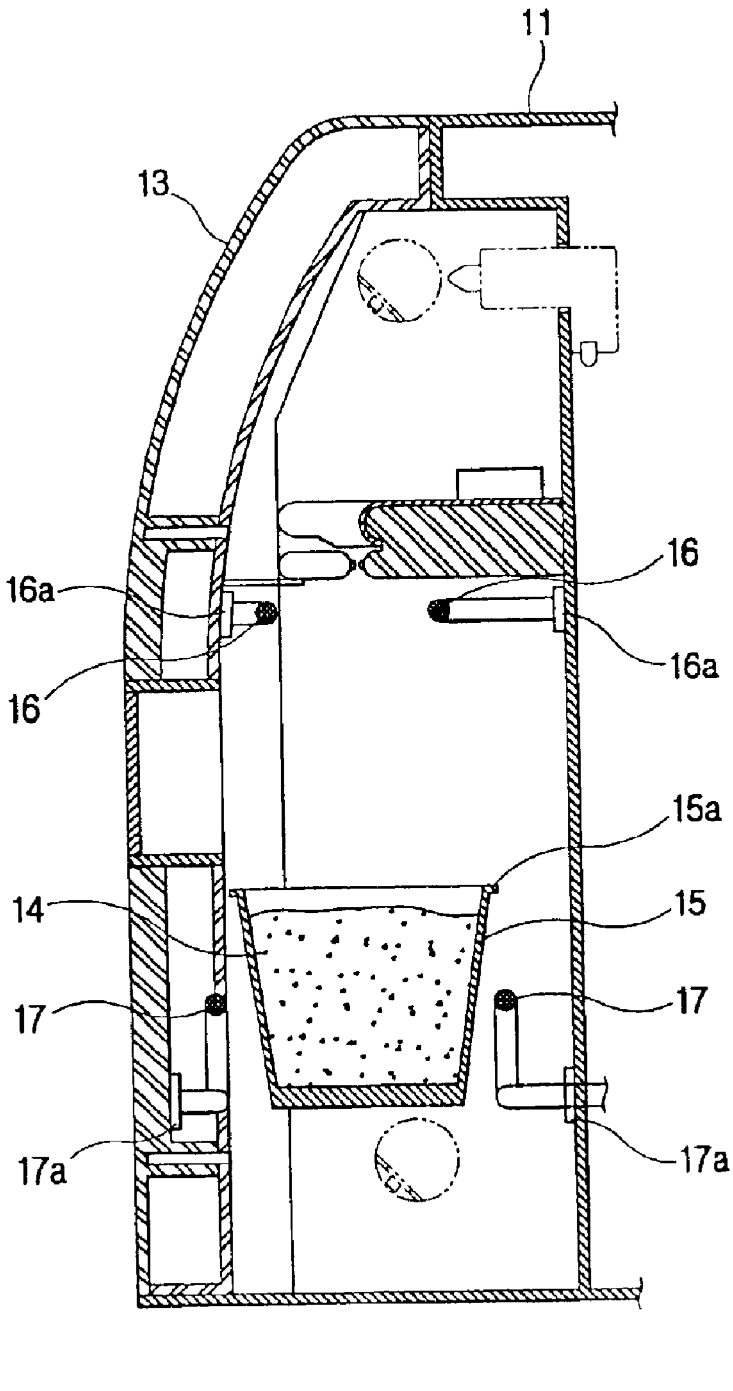
FIG. 1 is a side sectional view partially illustrating a conventional bread maker.

Hereinafter, embodiments of the present invention will be described in detail with reference to the attached drawings, wherein the like reference numerals refer to the like elements throughout. The present invention may, however, be embodied in many different forms and should not be construed as being limited to the embodiments set forth herein; rather, these embodiments are provided so that the present disclosure will be thorough and complete, and will fully convey the concept of the invention to those skilled in the art.

Figure 2:
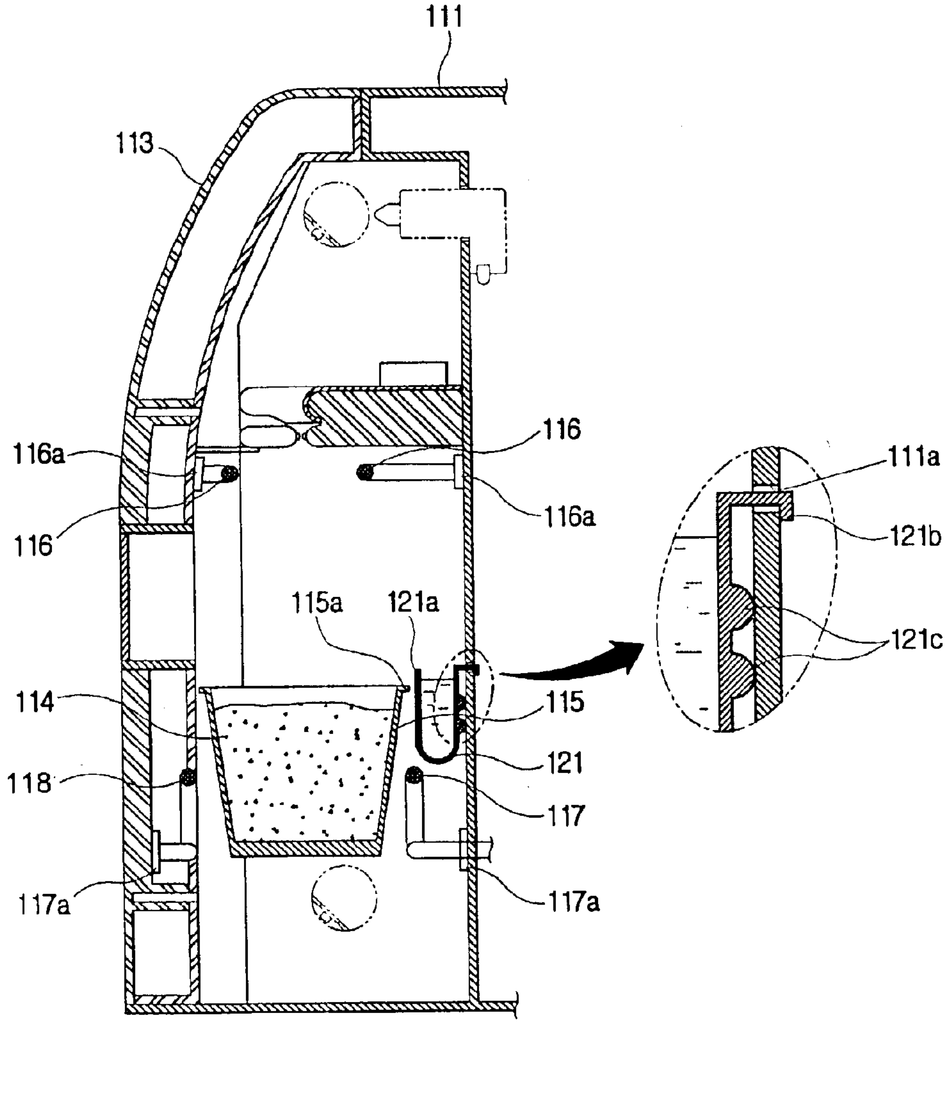
FIG. 2 is a side sectional view partially illustrating a bread maker according to a first embodiment of the present invention.

FIG. 2 is a side sectional view partially illustrating a bread maker according to a first embodiment of the present invention. As shown therein, a bread maker according to the first embodiment of the present embodiment includes a casing 111 forming an outer enclosure, a door 113 rotatably attached to the casing 111 to open and close an entrance in the casing 111, and a baking tray 115 inside the casing 111 in which dough 114 for bread is contained.

On the lower inside walls of the casing 111 facing opposite walls of the baking tray 115 are lower brackets 117*a*. Lower heaters 117 and 118 are connected to the lower brackets 117*a* for baking a lateral part of the dough 114 contained in the baking tray 115. On the upper inside walls of the casing 111 facing an opening 115*a* in the top of the baking tray 115 are upper brackets 116*a*. Upper heaters 116 are connected to the upper brackets 116*a* for baking an upper part of the dough 114 contained in the baking tray 115.

Figure 5:
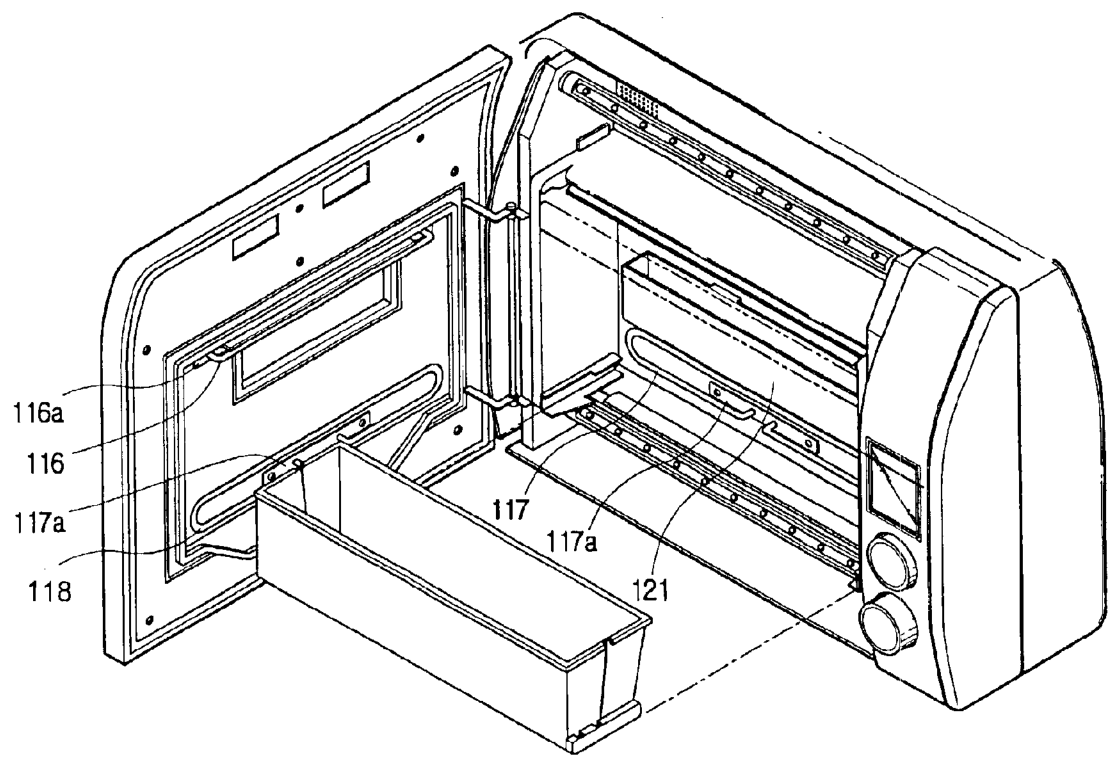
FIG. 5 is a perspective view of the bread maker according to the first embodiment of the present invention.

As shown in FIGS. 2 and 5, a water reservoir 121 is located above the lower heater 117 to increase heating efficiency for the water reservoir 121. To further increase heating efficiency, the water reservoir 121 is made of a metal having a high thermal conductivity. Thus, when the water reservoir 121 is heated by the lower heater 117, the water in the water reservoir 121 evaporates, supplementing the surface of the dough 114 contained in the baking tray 115 with vaporized water from the water reservoir 121 while the dough 114 is baking.

Figure 3:
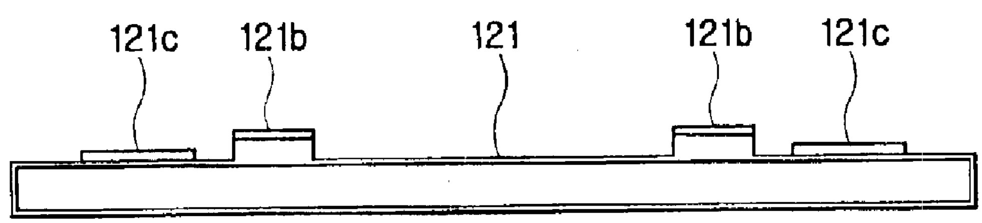
FIG. 3 is a front view of a water reservoir mounted on the bread maker of FIG. 1.
Figure 4:
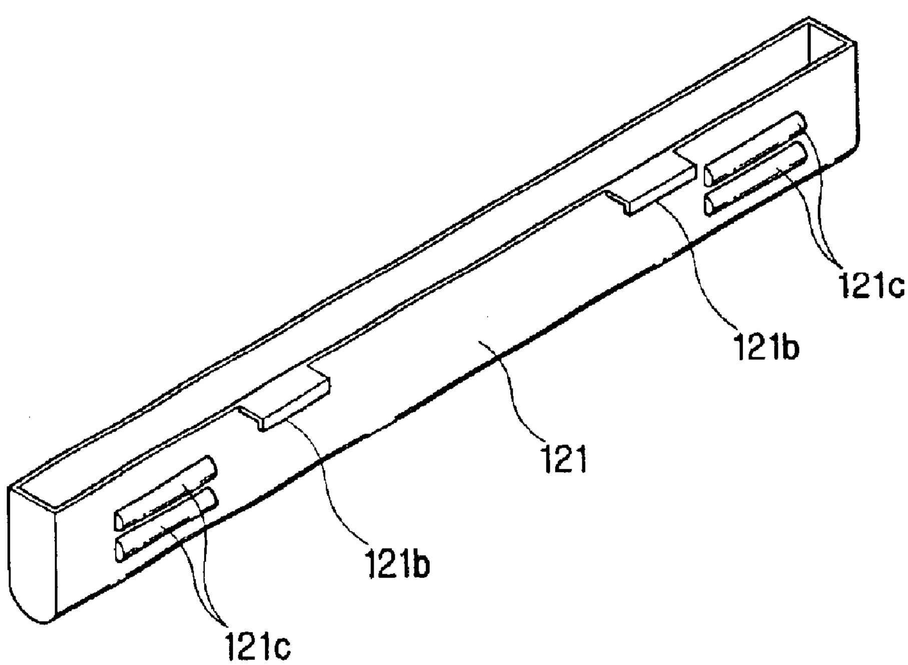
FIG. 4 is a rear perspective view of the water reservoir shown in FIG. 3.

Referring to FIGS. 2 through 4, to one side of an opening 121*a* in the top of the water reservoir 121 are a plurality of hooking flanges 121*b*, and in an inside wall of the casing 111 adjacent to the water reservoir 121 is a hooking flange holder 111*a* to which the hooking flanges 121*b* are hooked and supported. With this, the water reservoir 121 is detachably installed to the inside wall of the casing 111. In the present embodiment, the water reservoir 121 has the hooking flange 121*b*, and the casing 111 has the hooking flange holder 111*a*. However, in another embodiment, the casing 111 may have the hooking flange, and the water reservoir 121 may have the hooking flange holder. Further, the casing 111 may have a supporting holder (not shown) to support a lower part of the water reservoir 121.

Referring to FIGS. 2 and 4, the water reservoir 121 has projections 121*c* under the hooking flanges 121*b*, which are employed for preventing the water reservoir 121 from being tipped when the hooking flanges 121*b* are hooked onto the hooking flange holder 111*a*. The projections 121*c* protrude substantially the same distance as the hooking flanges 121*b*. In the present embodiment, the projections 121*c* are provided in the water reservoir 121. However, in another embodiment, the projections may be provided in the casing 111.

As shown in FIG. 2, the distance from the bottom of the bread maker to the opening 121*a* of the water reservoir 121 is approximately equal to or slightly higher than the distance to the opening 115*a* of the baking tray 115. Hence, the steam generated from the water reservoir 121 can be easily supplied to the surface of the dough 114 while the dough 114 is baked.

In the present embodiment, the water reservoir 121 is, as shown in FIG. 2, provided inside the casing 111 distant from the door 113. However, the water reservoir 121 may be provided inside the casing 111 adjacent to the door 113.

In the bread maker according to the first embodiment of the present invention, the lower heater 117 heats both the baking tray 115 and the water reservoir 121.

Figure 6:
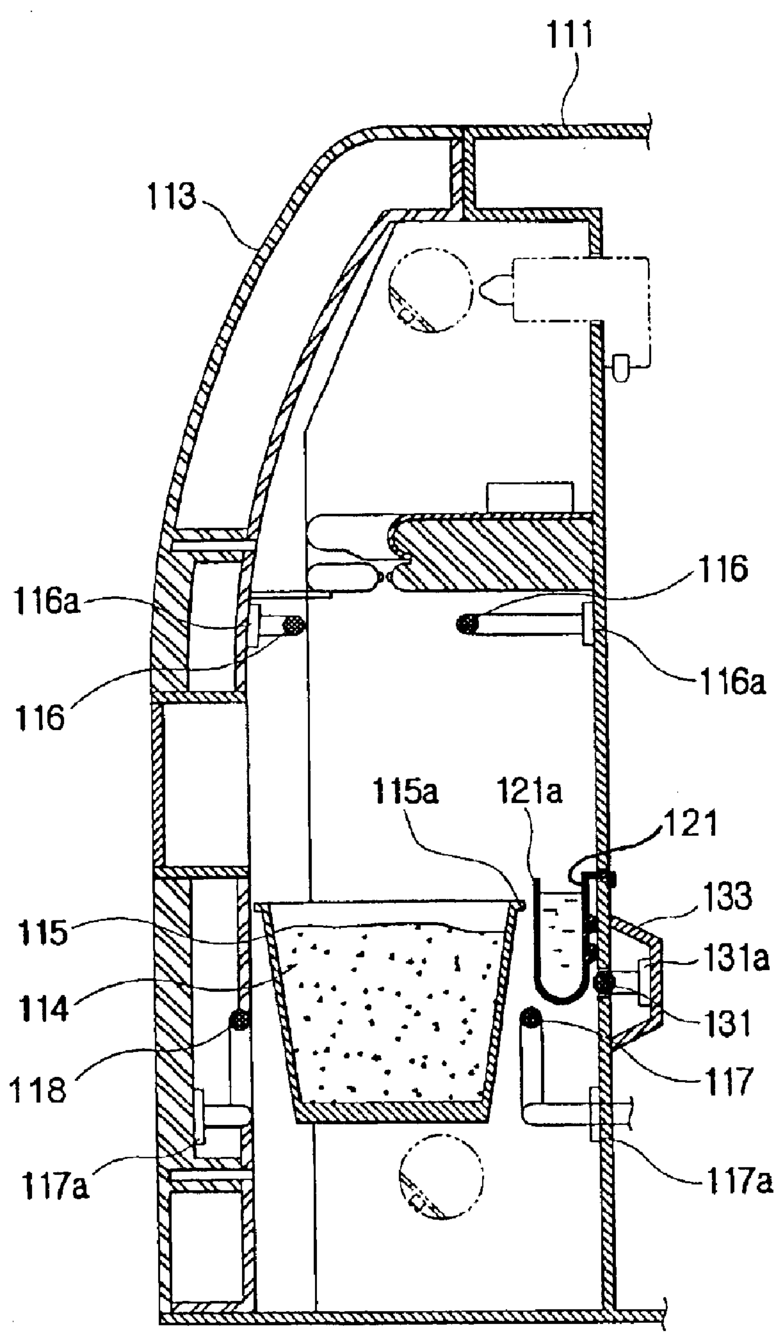
FIG. 6 is a side sectional view partially illustrating a bread maker according to a second embodiment of the present invention.

FIG. 6 is a side sectional view partially illustrating a bread maker according to a second embodiment of the present invention. As shown therein, compared to the first embodiment, the bread maker according to the second embodiment includes an auxiliary heater 131 adjacent to the lateral part of the water reservoir 121.

The auxiliary heater 131 is employed for adjusting the amount of the steam generated from the water reservoir 121. That is, when the steam is insufficiently generated from the water reservoir 121, the auxiliary heater 131 heats the water reservoir 121, thereby increasing the amount of the steam. The auxiliary heater 131 is controlled independently of the upper and lower heaters 116, 117, and 118 and a hygrometer (not shown) is provided for controlling the auxiliary heater 131.

The auxiliary heater 131 passes through the casing 111 and is surrounded with a heat-insulated bracket 133 provided in the outside wall of the casing 111. The heat-insulated bracket 133 has a supporting bracket 131*a* supporting the auxiliary heater 131, and is used for heat insulation. Further, the casing 111 is formed with a hole through which the auxiliary heater 131 is passed and arranged near the water reservoir 121.

In the bread maker according the second embodiment, the lower heater 117 heats both the baking tray 115 and the water reservoir 121, and the auxiliary heater 131 controls the amount of the steam when the steam is insufficiently generated from the water reservoir 121.

As described above, the present invention provides a bread maker in which the moisture environment inside is controlled by a simple steam generating structure, so that bread is satisfactorily baked.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A bread maker having a casing forming an outer enclosure, and a baking tray inside the casing to contain bread dough, comprising:

an upper heater inside the casing and facing an opening in the top of the baking tray to heat the baking tray;

a lower heater inside the casing and facing a lateral part of the baking tray to heat the baking tray; and a water reservoir filled with water inside the casing adjacent to the lower heater, and generating steam while being heated by the lower heater, wherein a distance from a bottom of the bread maker to a top of the water reservoir is substantially equal to or greater than a distance from the bottom of the bread maker to the top of the baking tray to readily supply steam to the bread dough;

wherein the bread maker is configured to generate steam during a bread making process.

2. The bread maker according to claim 1, wherein the water reservoir is detachably installed to the inside of the casing.

3. The bread maker according to claim 2, wherein the water reservoir has at least one hooking flange at a side thereof, and the casing has at least one hooking flange holder to which the hooking flange of the water reservoir is attached.

4. The bread maker according to claim 3, wherein the water reservoir has a plurality of projections under the hooking flanges, which protrude from the side of the water reservoir substantially the same distance as the hooking flanges, to prevent the water reservoir from tipping when the hooking flanges are hooked onto the hooking flange holder.

5. The bread maker according to claim 3, wherein the casing has a projection under the hooking flange holder, which protrudes from the side of the water reservoir substantially the same distance as the hooking flange.

6. The bread maker according to claim 3, further comprising an auxiliary heater inside the casing to heat a lateral part of the water reservoir and adjust an amount of the steam generated from the water reservoir.

7. The bread maker according to claim 6, further comprising a heat-insulated bracket connected to an outside wall of the casing adjacent to the auxiliary heater, and used for heat insulation.

8. The bread maker according to claim 4, further comprising an auxiliary heater inside the casing to heat a lateral part of the water reservoir and adjust an amount of the steam generated from the water reservoir.

9. The bread maker according to claim 8, further comprising a heat-insulated bracket connected to an outside wall of the casing adjacent to the auxiliary heater, and used for heat insulation.

10. The bread maker according to claim 1, wherein the water reservoir is made of a metal having a high thermal conductivity.

11. The bread maker according to claim 3, wherein the hooking flanges are attached to the casing and the hooking flange holders are attached to the water reservoir.

12. The bread maker according to claim 1, further comprising a supporting holder inside the casing to support a lower part of the water reservoir.

13. The bread maker according to claim 1, wherein the water reservoir is located adjacent to a door attached to the casing.

14. The bread maker according to claim 7, wherein the auxiliary heater is passed through an opening in the casing and placed near the water reservoir, and the heat-insulated bracket surrounds the portion of the auxiliary heater extending outside the casing.

15. The bread maker according to claim 7, wherein the heat-insulated bracket includes a supporting bracket to support the auxiliary heater.

16. A water reservoir for a bread maker having a casing, and a baking tray and a heater inside the casing, comprising:

a container holding water inside the casing adjacent to the heater, the container being heated by the heater to produce steam;

a plurality of hooking flanges on a back side of the container and a plurality of hooking flange holders attached to the inside of the casing to receive the hooking flanges and support the container; and a plurality of projections on the back side of the container, extending substantially the same distance as the hooking flanges, to prevent the container from tipping as the hooking flanges are attached to the hooking flange holders.

17. The water reservoir according to claim 16, wherein a distance from a bottom of the bread maker to a top of the container is substantially equal to or greater than a distance from the bottom of the bread maker to the top of the baking tray to readily supply steam to dough in the baking tray.

18. The water reservoir according to claim 16, wherein the container is detachably installed to the inside of the casing.

19. The water reservoir according to claim 16, wherein the container is made of a metal having a high thermal conductivity.

20. A steam generation assembly for a bread maker having a casing, and a baking tray and a heater inside the casing, comprising:

a water reservoir holding water inside the casing adjacent to the heater, the water reservoir being heated by the heater to produce steam;

a plurality of hooking flanges on a back side of the water reservoir and a plurality of hooking flange holders attached to the inside of the casing to receive the hooking flanges and support the water reservoir;

a plurality of projections on the back side of the water reservoir, extending substantially the same distance as the hooking flanges, to prevent the water reservoir from tipping as the hooking flanges are attached to the hooking flange holders; and an auxiliary heater inside the casing and adjacent to the water reservoir, the auxiliary heater heating the water reservoir to generate additional steam.

21. The assembly according to claim 20, wherein a distance from a bottom of the bread maker to a top of the water reservoir is substantially equal to or higher than a distance from the bottom of the bread maker to the top of the baking tray to readily supply steam to dough in the baking tray.

22. The assembly according to claim 20, wherein the water reservoir is detachably installed to the inside of the casing.

23. The assembly according to claim 20, further comprising a heat-insulated bracket connected to an outside wall of the casing adjacent to the auxiliary heater, and used for heat insulation.

24. A steam generation apparatus for a bread maker having a casing, a baking tray inside the casing, and a heater inside the casing to heat the baking tray, comprising:

a water reservoir holding water inside the casing adjacent to the heater, the water reservoir being heated by the heater to produce steam;

an auxiliary heater projecting through the casing into an interior of the casing adjacent to the water reservoir, the auxiliary heater heating the water reservoir to generate additional steam; and a heat-insulated bracket attached to an outside wall of the casing adjacent to and surrounding the auxiliary heater to provide heat insulation.

25. The apparatus according to claim 24, wherein a distance from a bottom of the bread maker to a top of the water reservoir is substantially equal to or higher than a distance from the bottom of the bread maker to the top of the baking tray to readily supply steam to dough in the baking tray.

26. The apparatus according to claim 24, wherein the water reservoir is detachably installed to the inside of the casing.

27. The apparatus according to claim 24, wherein the auxiliary heater is passed through an opening in the casing and placed near the water reservoir, and the heat-insulated bracket surrounds the portion of the auxiliary heater extending outside the casing.

* * * * *

UNITED STATES PATENT AND TRADEMARK OFFICE

CERTIFICATE OF CORRECTION

PATENT NO. : 6,951,167 B2
APPLICATION NO. : 10/308005
DATED : October 4, 2005
INVENTOR(S) : Han-jun Sung et al.

It is certified that error appears in the above-identified patent and that said Letters Patent is hereby corrected as shown below:

On the Title page, (73) Assignee, change “Electronic” to --Electronics--

Signed and Sealed this

Eleventh Day of July, 2006

JON W. DUDAS
*Director of the United States Patent and Trademark Office*